(12) United States Patent
Redner

(10) Patent No.: US 6,190,442 B1
(45) Date of Patent: Feb. 20, 2001

(54) AIR FILTER GAUGE

(75) Inventor: Robert P. Redner, Orchard Lake, MI (US)

(73) Assignee: Tishken Products Co., Detroit, MI (US)

(*) Notice: Under 35 U.S.C. 154(b), the term of this patent shall be extended for 0 days.

(21) Appl. No.: 09/387,302

(22) Filed: Aug. 31, 1999

(51) Int. Cl.[7] ................................................. B01D 46/42
(52) U.S. Cl. .................... 96/421; 55/DIG. 34; 73/31.04; 116/268; 116/271; 116/DIG. 25
(58) Field of Search .................. 96/421; 95/19, 95/25; 55/DIG. 34; 73/31.04; 116/270, 271, 272, 268, 266, DIG. 25

(56) References Cited

U.S. PATENT DOCUMENTS

| Re. 26,752 | * | 1/1970 | Rosaen | 116/70 |
|---|---|---|---|---|
| 2,034,373 | * | 3/1936 | Bilde | 116/114 |
| 2,114,105 | * | 4/1938 | Gerber | 116/65 |
| 2,700,362 | * | 1/1955 | Calling | 116/117 |
| 2,707,879 | * | 5/1955 | Dwyer | 96/421 |
| 3,024,655 | * | 3/1962 | Dwyer et al. | 116/268 |
| 3,027,865 | * | 4/1962 | Kautz et al. | 96/421 |
| 3,056,379 | * | 10/1962 | Thomas | 116/70 |
| 3,066,527 | * | 12/1962 | Stein | 96/421 |
| 3,150,633 | * | 9/1964 | Holl | 116/70 |
| 3,244,282 | * | 4/1966 | Rosaen | 116/268 |
| 3,276,586 | * | 10/1966 | Rosaen | 116/90 |
| 3,313,418 | * | 4/1967 | Rosaen | 116/90 |
| 3,325,010 | * | 6/1967 | Sackett | 116/268 |
| 3,358,836 | * | 12/1967 | Schmitt | 116/268 |
| 3,422,791 | * | 1/1969 | Rosaen | 116/70 |
| 3,440,802 | * | 4/1969 | Rosaen et al. | 116/DIG. 25 |
| 3,556,043 | * | 1/1971 | Vayda | 116/114 |
| 3,916,817 | * | 11/1975 | Kemp | 116/DIG. 25 |
| 3,934,543 | * | 1/1976 | Howard | 96/421 |
| 4,139,466 | * | 2/1979 | Rosaen | 116/268 |
| 4,184,376 | * | 1/1980 | Thomas et al. | 116/266 |
| 4,688,511 | * | 8/1987 | Gerlach et al. | 96/421 |
| 5,351,035 | * | 9/1994 | Chrisco | 116/DIG. 25 |

* cited by examiner

*Primary Examiner*—Duane S. Smith
(74) *Attorney, Agent, or Firm*—Dykema Gossett, PLLC

(57) ABSTRACT

An air filter cleanness gauge is provided. The gauge in a preferred embodiment includes a transparent cover. The housing has a first opening for fluid communication with the atmosphere and a second opening having fluid communication with a fluid source exposed to a filter. A vane is pivotally connected within the housing and provides a pressure boundary between the first and second openings. Movement of the vane indicates a change in pressure differential between the atmosphere and the fluid source, thereby indicating a need to change the air filter.

19 Claims, 3 Drawing Sheets

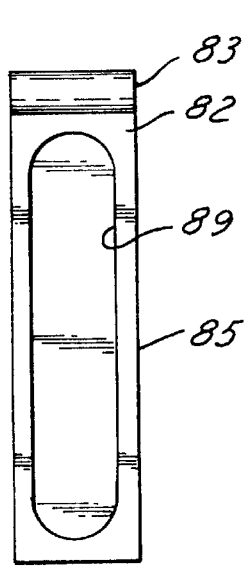 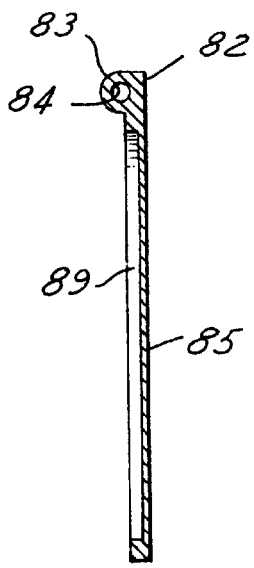 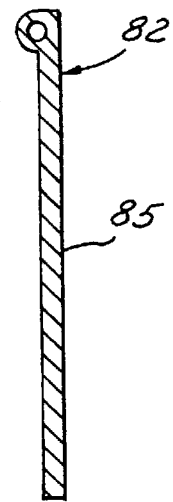
FIG. 7　　　FIG. 8　　　FIG. 9
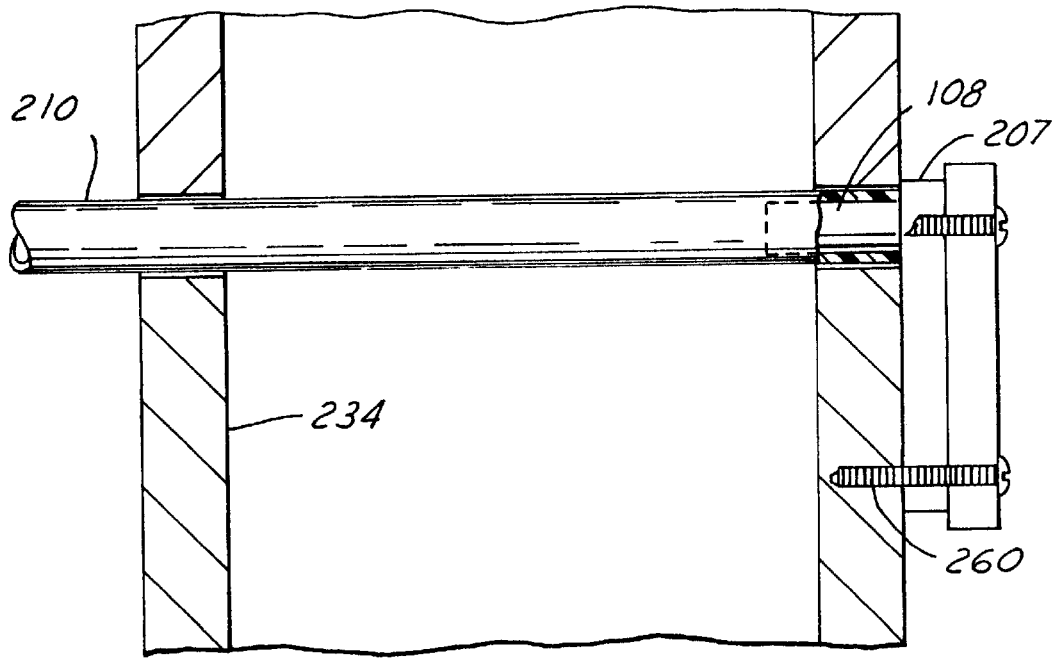
FIG. 10

AIR FILTER GAUGE

FIELD OF THE INVENTION

The field of the present invention is that of fluid filter cleanness gauges. More particularly, the field of the present invention is that of a gauge to determine the cleanness of a filter used in a heating, ventilation, or air conditioning (HVAC) system.

PRIOR DEVELOPMENTS

Most conventional HVAC systems for homes or light commercial building use have a replaceable incoming air filter. Additionally, many vehicle HVAC systems also have replaceable filters. The filter is used to entrap dust and other foreign matter in the air and to prevent their distribution into the HVAC machinery. The filter is also used to prevent dust or other foreign matter from entering the interior environment of the building or vehicle. As the filter is fouled and accumulates dust, a greater pressure drop is experienced as the air passes through the filter. If the filter is not replaced this pressure drop can become excessive and reduce the efficiency of the HVAC system.

To prevent a reduction in efficiency, the HVAC operator should appropriately change the air filter. However, fouling of the filter is dependent upon many factors including the exterior and interior environments and the rate of usage of the HVAC system. Therefore, fouling of the air filter is not always linear with respect to time. However, many filter replacements were completed on a time-based formula which may or may not accurately reflect the fouling of the filter.

To overcome the above-noted haphazard approach to filter replacement, filter cleanness gauges have been provided. A filter cleanness gauge typically monitors filter cleanness by monitoring the pressure differential between an ambient air reservoir and the plenum between the filter and the blower of the HVAC system. A prior filter cleanness gauge is shown and described in Dwyer, et al., U.S. Pat. No. 3,024,655. Dwyer provides a filter gauge which has a body of molded transparent plastic material having a vertically positioned float tube. The upper end of the float tube communicates with the plenum chamber at the suction side of the air circulating fan of the HVAC system. The float tube has inserted therein a float ball. Although the Dwyer filter gauge performs in a satisfactory manner, it brings forth certain disadvantages. The first disadvantage is that the plastic molding is somewhat complex. The second disadvantage is that the filter gauge can ingest dust and other foreign matter into the float chamber. Over a period of time, the dust and foreign matter can cause the float to operate improperly or to be obscured from easy viewing. Another filter cleanness gauge is provided by the Honeywell S830A filter cleanness gauge. The Honeywell filter cleanness gauge has a diaphragm member and therefore is less susceptible to malfunction due to the ingestion of dust in the air. However, the Honeywell air cleanness gauge is relatively large and bulky, requires electrical connections, and is relatively expensive. Although the aforementioned filter cleanness gauges have been successfully used, it is a constant desire to provide such a gauge with equal or superior functioning characteristics while at the same time providing a gauge at a lower manufacturing cost. It is also desirable to provide a filter cleanness gauge which does not require a costly diaphragm member. It is also a desire to provide a filter cleanness gauge which does not utilize a diaphragm member but is less susceptible to fouling due to the ingestion of dust into the gauge from an opening to the ambient air.

SUMMARY OF THE INVENTION

To meet the above-noted and other desires the revelation of the present invention is brought forth. In a preferred embodiment the present invention brings forth a filter air pressure cleanness gauge that is free from any requirement of utilization of a diaphragm member. The filter cleanness gauge of the present invention also provides a freedom from fouling due to dusty ambient air conditions. Furthermore, the present invention provides the liberty of remote installation of the filter cleanness gauge. Still further, the present invention in a preferred embodiment provides the liberty of an air filter cleanness gauge which can be readily modified for different filter pressure conditions with the change of one small component, therefore providing a single filter cleanness gauge which can function in a plurality of filter conditions without the necessity of extensive change of the filtering cleanness gauge design or dimensions.

In a preferred embodiment, the present invention provides a filter cleanness gauge which includes a housing with a transparent cover. The housing has a first opening into the atmosphere. The first opening has a variable orifice. The housing has a second opening spaced away from the first opening. The second opening has fluid communication with a fluid source exposed to the filter. A pivotal vane is mounted within the housing and provides a pressure boundary between the first and second housing openings wherein a pressure differential between the atmosphere and the fluid source exposed to the filter causes the vane to pivot to indicate a pressure differential representative of the cleanness of the filter.

It is an object of the present invention to provide a filter cleanness gauge. It is an object of the present invention to provide a filter cleanness gauge which does not utilize a diaphragm. It is an object of the present invention to provide a filter cleanness gauge which in a preferred embodiment can be protected from fouling due to dust or foreign matter in ambient air. It is an object of the present invention to provide a filter cleanness gauge which can be utilized in a multitude of pressure ranges and which can also be remotely mounted. It is an object of the present invention to provide an air filter cleanness gauge with a dial presentation that is easy to read and interpret. It is an object of the present invention to provide an air filter cleanness gauge with a straightforward calibration procedure. It is an object of the present invention to provide a filter cleanness gauge which is easy to install, can be remotely mounted and is easy to assemble at a low cost. It is still further an object of the present invention to provide a filter cleanness gauge which can be used with different blower-filter combinations such as warm air furnaces, air conditioners, automotive cabin air filters, etc. It is still further an object of the present invention to provide a filter cleanness gauge with a pivotal vane wherein the pivotal vane can be varied in the molding procedure to accommodate different pressure differential sensitivities.

The above features and advantages of the present invention will be apparent from the following description of the preferred embodiment considered in conjunction with the accompanying drawings.

BRIEF DESCRIPTION OF THE DRAWINGS

FIG. 7 is a side elevational view of a vane of the filter cleanness gauge shown in FIGS. 3, 4 and 5.

FIG. 8 is a side elevational view of the pivotal vane shown in FIG. 7.

FIG. 9 is an alternate preferred embodiment vane.

FIG. 10 is a side elevational view of an alternate preferred embodiment fluid pressure gauge according to the present invention wherein the pressure gauge is installed in a remote location.

DESCRIPTION OF THE PREFERRED EMBODIMENT

Figure 1:
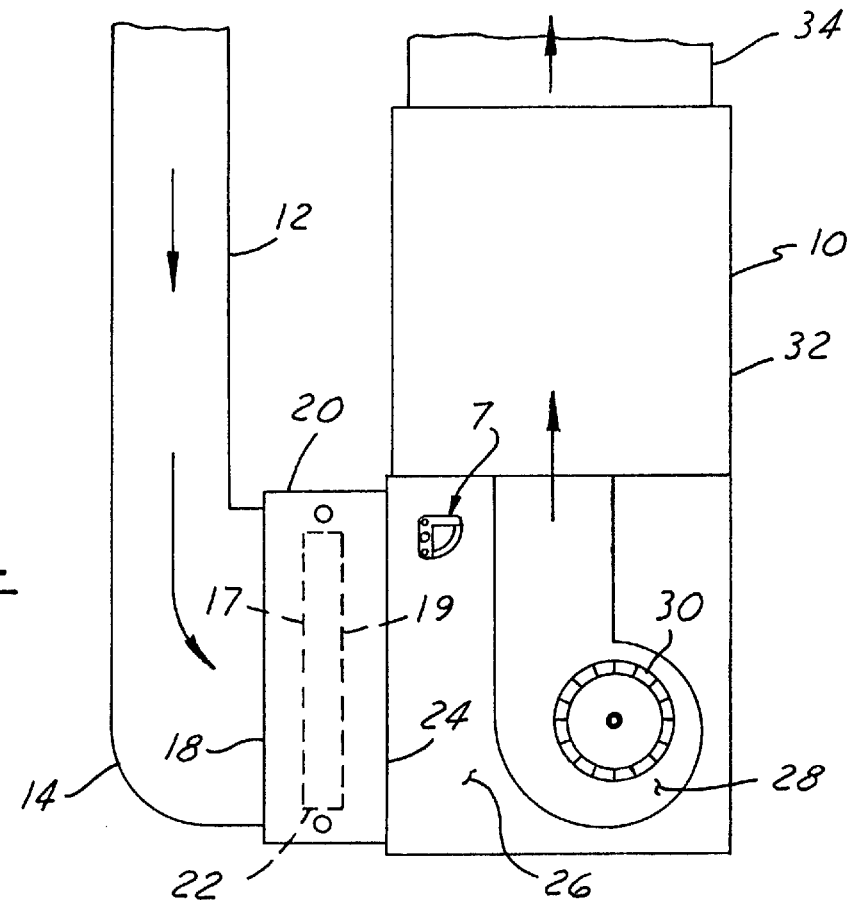
FIG. 1 is a side elevational view of a forced-air furnace utilizing a filter cleanness gauge according to a preferred embodiment of the present invention.

FIG. 1 illustrates a preferred embodiment fluid filter cleanness gauge 7 being utilized in the environment of a forced-air furnace 10. The furnace 10 has an air intake duct 12 with a lower elbow 14. The outlet of the elbow 14 is fed into an intake 18 of a filter housing 20. The filter housing 20 mounts a fluid filter 22, commonly referred to as an air filter, to remove dust and other foreign matter from the air. The filter 22 will typically be a replaceable or cleanable filter. The outlet 24 of the filter housing feeds into a plenum 26 of the furnace. The plenum 26 of the furnace feeds air into a lower compartment 28. The air is then pressurized by a blower 30 to enter into a heating chamber 32. The heating chamber 32 typically includes a plurality of heat exchangers which receive thermal energy from a natural gas burner (not shown). The heated air then leaves the furnace 10 and enters into the warm air duct work 34 of a building.

The filter 22 is utilized to prevent dust and other foreign matter from entering into the furnace 10 and thereafter being distributed through the warm air duct 34 and into the building. As will be apparent to those knowledgeable in the art, a pressure drop exists from an intake side 17 of the filter 22 to an outlet side 19. It is apparent to those skilled in the art that this pressure drop increases with fouling of the filter 22. It is also apparent to those skilled in the art that the fouling of the filter 22 is related to the pressure drop across the filter 22. Pressure drop across the filter 22 can be detected by monitoring the pressure change in the plenum 26. To measure the pressure changes in plenum 26, there is provided a fluid filter cleanness or air filter gauge 7.

Referring additionally to FIGS. 2–8, the air filter gauge 7 has a housing 40. The housing 40 has two larger components. The first large component is a base 42. The base 42 is typically made from a molded polymeric substance such as high impact polystyrene plastic. To provide a clear background the base is often molded in white. The second large component is a cover 44. The cover 44 is typically made from a translucent, preferably transparent polymeric substance such as a clear acrylic or other suitable alternative. The cover 44 has a face 46 and a rim 48 which is fitted over a rim 50 of the base and is hermetically affixed thereto. The base 42 as mentioned previously has a rim 50 which is adjoined to a wall 54. Between the wall 54 of the base 42 and the face 46 of the cover 44 there exists a first major pressure volume. The cover 44 and base 42 each have three holes or bores 58 to allow them to be connected by fasteners 60. The fasteners 60 may be conventional screws which penetrate the cover 44 and base 42 into the structure of the furnace 10 or can be plastic expansion-type screws which hold just the cover 44 to the base 42.

Figure 5:
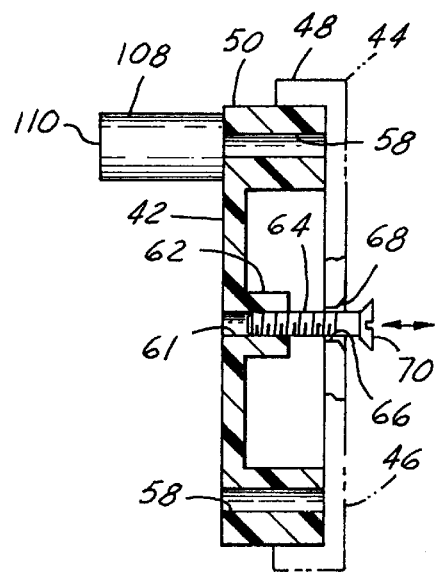
FIG. 5 is a sectional view taken along lines 5—5 of FIG. 4.

The base 42 has extending from its wall 54 a studded cylinder with a through bore 61 providing a screw mount 62. The screw mount 62 mounts an elongated, headed orifice member which is provided by a flat head screw 64, as shown in FIG. 5. A first opening is provided in the cover face 46 by an aperture 66 having a taper 68. The head of the flat head screw 64 is moved in toward and out from the bore 66 by rotation of the screw 64 by a simple screwdriver engaging the screw head 70 to orifice the first opening.

Figure 3:
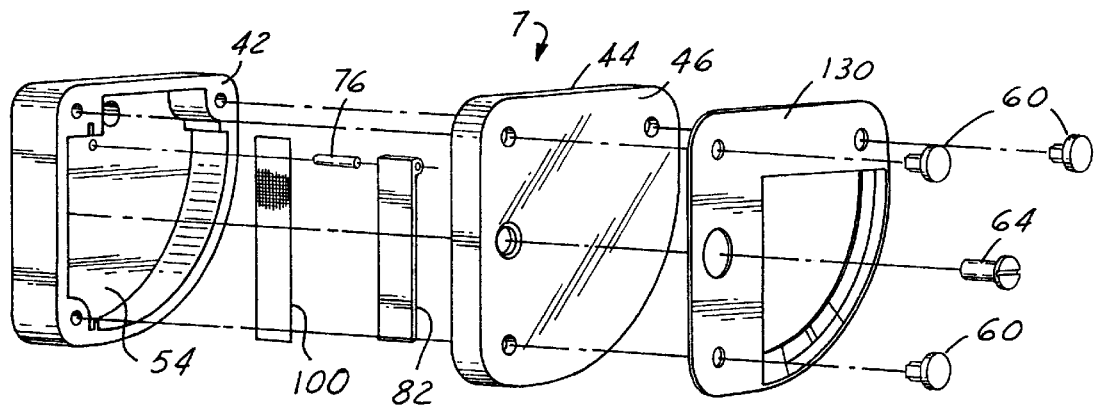
FIG. 3 is an enlarged exploded view of the components of the filter cleanness gauge shown in FIGS. 1 and 2.
Figure 4:
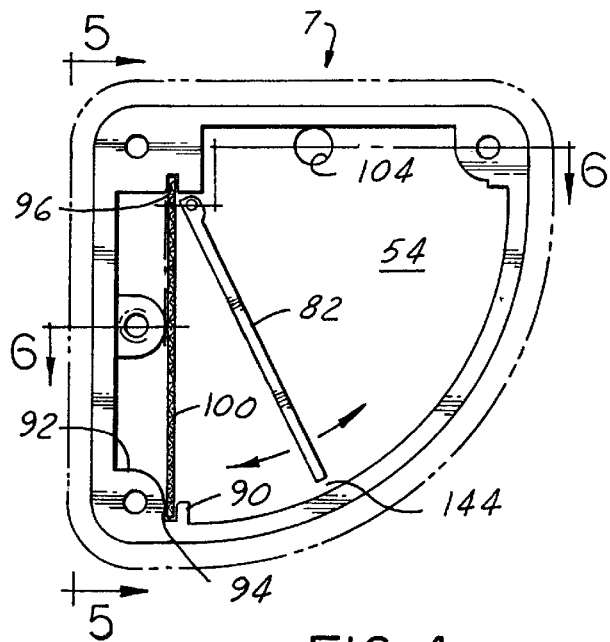
FIG. 4 is a front elevational view of a portion of a housing of the filter cleanness gauge shown in FIGS. 1–3.
Figure 6:
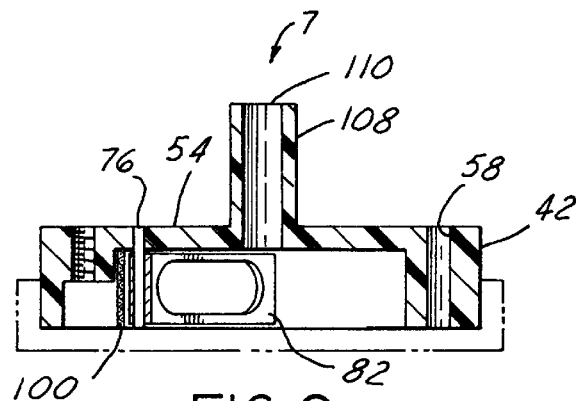
FIG. 6 is a sectional view taken along lines 6—6 of FIG. 4.

As best shown in FIGS. 3, 4 and 6, a pin 76 is mounted into a bore which is predrilled into the wall 54 of the base 42. Opposite the wall 54, an end of the pin 76 is abutted by the face 46 of the cover. The pin 76 as shown would typically be made from a carbon steel having a black oxide finish or a stainless steel which has been ground and polished, or other suitable alternatives.

Pivotally connected on the pin 76 is a vane 82. The vane 82 is typically somewhat less than 1½ inches long and is shown as made from a rigid plastic such as a high impact black polystyrene or other suitable alternatives. The vane 82 has a head 83 with a bore 84 which encircles the pin 76. Connected with the head 83 is a leg 85. The vane 82 pivots freely upon the pin 76 and in a rest position, the van leg 85 assumes the position shown in FIG. 3 wherein it hangs almost vertically. The vane 82 can be made of one piece with a cavity 89 of different depths by adjusting a core in the molding die. Increasing the depth of the cavity reduces the weight of the vane. FIG. 9 shows the vane 82 without a cavity in leg 85. The cavity can have a depth of 0.000 to 0.035 inch. The depth of the cavity and the resultant angular moment of inertia of the vane 82 are selected according to the predetermined desired pressure differential sensitivity of the air filter gauge 7. In a rest position the vane leg 85 hangs essentially vertically and abuts a lower stop 90. The stop 90 along with an edge of a boss 92 forms a nest 94. At an opposite end of the base 42 is a corresponding nest 96. The nests 94 and 96 mount a dust screen filter 100 adjacent the vane 82 (in the vane rest position). The screen filter 100 as shown is made from a monel or stainless wire cloth or other suitable alternatives having a 60×60 mesh. The screen filter 100 divides the interior of the housing into a first control volume in fluid communication with the first opening 66 and a second control volume having fluid communication with the second opening 104. The screen filter 100 prevents fouling of a portion of the housing wherein the vane moves in and helps to contribute to a longer life for the filter cleanness gauge 7.

The second fluid opening 104 is connected with a tubular member 108. The end 110 of the tubular member 108 fluidly communicates with a fluid source at a second pressure typically the plenum 26 of the furnace. The tubular member 108 also provides the function of structurally hanging the filter pressure gauge 7 to the furnace 10. The tubular member 108 is integral with the base 42. In the air filter cleanness gauge 207 as shown in FIG. 10, an elongated flexible tubing 210 attached to tubular member 108 allows the filter gauge to monitor the cleanness of a filter from the outside wall of the furnace room for example or other remote locations. The expansion-type screws 60 are replaced with screws 260 which allow the filter cleanness gauge 207 to be fixably attached to the furnace room wall 234. The opposite end of the flexible tubing is inserted through an opening in plenum 26 (FIG. 10) to monitor pressure change in the plenum.

An indicator marking facing 130 is provided which can be connected by fastener 60 or adhesively applied to the face 46 of the cover 44. The facing 130 provides visual communication to a HVAC operator of what positions of the vane 82 that replacement of filter 22 is desired.

The operation of the air filter cleanness gauge is as follows. An aperture is made in the furnace 10 to allow entry of the tubular member 108. The back of the wall 54 will typically have self-adhesive strips (not shown) to allow the air filter cleanness gauge 7 to adhere to the furnace wall. The air filter cleanness gauge 7 second opening 104 will have fluid communication with the plenum chamber 26 of the suction side of the blower 30. As such, the opening 104 will be under a slight suction as will the interior of the housing 40. The first passage 66 fluidly communicates with the atmosphere. The entry of air from the atmosphere passes through the filter screen 100 and engages against the vane 82. The filter screen 100 prevents the interior of the air pressure cleanness gauge from being fouled from dust in the air. A slight amount of air passes underneath the vane 82 in a clearance area 144; however, the rate of air flowing underneath the vane 82 is diminumis. An operator will utilize a screwdriver to turn the head 70 of the adjustment screw to orifice the air flowing into the first fluid opening 66. The adjustment will be made such that the vane 82 is calibrated to a starting point 138 upon the replacement of a new filter 22.

Figure 2:
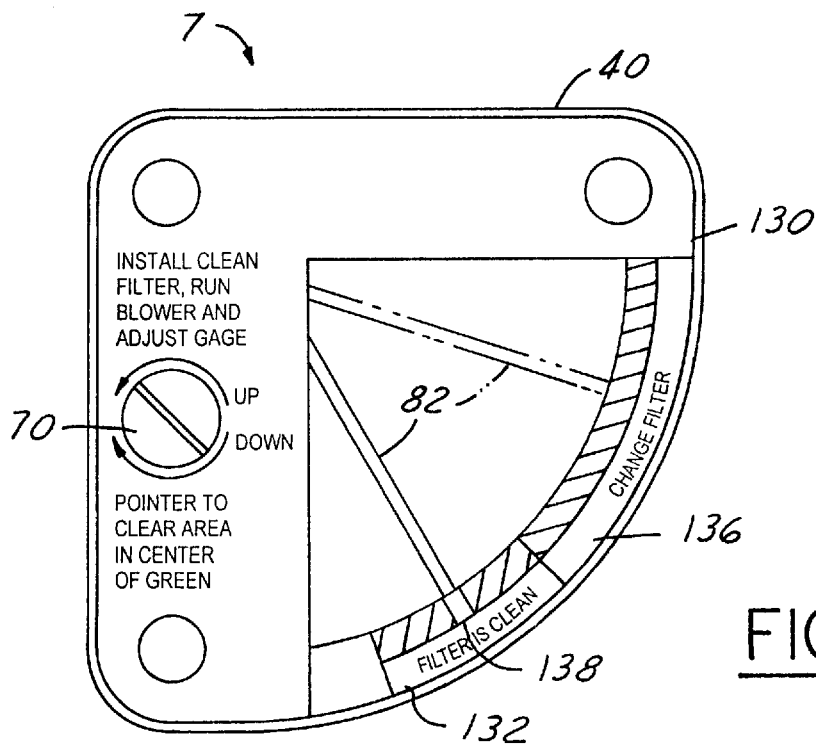
FIG. 2 is an enlarged front elevational view of the filter cleanness gauge shown in FIG. 1.

During operation of furnace 10, dust in the air flowing through the duct 12 will foul the filter 22. Fouling of the filter 22 will cause a greater pressure differential to be experienced across the filter 22. The greater pressure differential will cause a lowering of the pressure in plenum 26. The lowering of fluid pressure in plenum 26 will be fluidly communicated with the air filter gauge 7 via the second opening 104 causing the vane 82 to pivot in a counter-clockwise direction, as shown in FIG. 2. As the vane 82 continually pivots in a counter-clockwise direction, it will eventually indicate into the area 136 alerting the furnace operator for the need of a replacement of the filter 22. Upon replacement of filter 22, the screw 64 will again be rotated to bring the vane 82 to its proper calibration point 138 which is located in area 132 (FIG. 2) indicating that the filter is clean.

In view of the above description, it will be seen that several features and advantages of the invention are achieved and other advantageous results are obtained. Since various changes can be made in accordance with the above construction without departing from the scope of the invention, it is intended that all matter contained in the above description or shown in the accompanying drawings shall be interpreted as illustrative and not in a limited sense.

I claim:

1. A fluid filter cleanness gauge comprising:
   a housing with a translucent cover, said housing having a first opening into said housing for fluid communication with a fluid source at a first pressure, said first opening having a variable orifice, and said housing having a second opening spaced away from said first opening, said second opening having fluid communication with a second fluid source exposed to a filter at a second pressure; and
   a pivotal vane mounted within said housing providing a pressure boundary between said first and second openings wherein a pressure differential between said first and second pressure sources causes said pivotal vane to pivot to indicate said pressure differential.

2. A fluid filter cleanness gauge as described in claim 1 wherein said cover is transparent.

3. A fluid filter cleanness gauge as described in claim 1 wherein said housing has indicator markings for visual communication to an observer at what positions of said pivotal vane a filter replacement is desired.

4. A fluid filter cleanness gauge as described in claim 1 wherein said second opening is connected with a tubular member which is inserted through a control volume boundary.

5. A fluid filter cleanness gauge as described in claim 1 wherein said first opening variable orifice is provided by an elongated member with a head and movement of said head with respect to said first opening orifices said first opening.

6. A fluid filter cleanness gauge as described in claim 5 wherein said elongated member is threaded and rotation of said elongated member moves said head with respect to said first opening.

7. A fluid filter cleanness gauge as described in claim 1 wherein said pivotal vane in a rest position is generally oriented vertically.

8. A fluid filter cleanness gauge as described in claim 1 wherein there is a filter forming a control volume boundary between said first and second openings of said housing.

9. A fluid filter cleanness gauge as described in claim 1 wherein said pivotal vane moves about in a control volume bounded by said filter and said second opening.

10. A fluid filter cleanness gauge as described in claim 9 wherein said filter is generally adjacent said pivotal vane when said pivotal vane is in a rest position.

11. A fluid filter cleanness gauge as described in claim 9 wherein said pivotal vane in a rest position abuts a stop and said stop mounts an end of said filter.

12. A fluid filter cleanness gauge as described in claim 1 wherein said pivotal vane is formed from a rigid polymeric material.

13. A fluid filter cleanness gauge as described in claim 1 wherein the pivotal vane can be molded to a weight to determine a sensitivity range of said fluid cleanness gauge.

14. A fluid filter cleanness gauge as described in claim 13 wherein said vane has a cavity and the depth of said cavity determines the sensitivity range of said filter cleanness gauge.

15. A fluid filter cleanness gauge as described in claim 1 wherein said housing is molded from a polymeric material.

16. A fluid filter cleanness gauge as described in claim 1 wherein said housing mounts a pivot pin and said pivotal vane is pivotally connected upon said pivot pin.

17. A fluid filter cleanness gauge comprising:
   a polymeric housing with a transparent cover, said housing having a first opening for fluid communication with an atmospheric pressure source, said first opening having a variable orifice provided by a threaded fastener mounted within said opening with a head, wherein said head can be moved toward and away said housing to orifice said first opening, and said housing having a second opening spaced away from said first opening, said second opening having fluid communication with a plenum chamber exposed to an air filter, said second opening being connected with a tubular member extending through a pressure boundary;
   a filter member mounted within said housing forming first and second control volumes within said housing between said first and second openings;
   a rigid vane pivotally connected within said housing between said first and second openings having a generally vertical rest position wherein a pressure differential between said atmosphere and said plenum chamber causes said pivotal member to indicate said pressure differential.

18. An air filter cleanness gauge comprising:

a plastic housing with a transparent cover, said housing having a first opening for fluid communication with an atmospheric pressure source, said fluid opening having a variable orifice provided by a threaded fastener mounted within said opening with a head, wherein said head can be moved toward and away from said housing to orifice said first opening, and said housing having a second opening spaced away from said first opening, said second opening having fluid communication with a second fluid source at a second pressure source exposed to a filter, said second opening being connected with a tubular member extending through a control volume boundary;

the indicator markings on said housing for visual communication to an observer at what positions of said pivotal vane a filter replacement is desired;

a filter member mounted within said housing forming first and second control volumes within said housing between said first and second openings;

a rigid pivotal vane pivotally connected on a pin mounted within said housing between said first and second openings having a generally vertical rest position wherein a pressure differential between said first and second pressure sources causes said vane to align with said indicator marking on said housing to indicate a need to change said air filter.

19. An air filter cleanness gauge as described in claim 18 wherein said tubular member extends through at least two control volume boundaries.

* * * * *

UNITED STATES PATENT AND TRADEMARK OFFICE
CERTIFICATE OF CORRECTION

PATENT NO. : 6,190,442
DATED : FEBRUARY 20, 2001
INVENTOR(S) : ROBERT P. REDNER

It is certified that error appears in the above-identified patent and that said Letters Patent are hereby corrected as shown below:

ON THE TITLE PAGE
Item (73) ASSIGNEE : CANCEL --TISHKEN PRODUCTS, CO., DETROIT, MICHIGAN (U.S.)-- AND SUBSTITUTE --GENERAL FILTERS, INC. NOVI, MI. (U.S.)-- AS RECORDED ON AUGUST 31, 1999 REEL/FRAME: 010218/0567

Signed and Sealed this

Twenty-ninth Day of May, 2001

Attest:

NICHOLAS P. GODICI

*Attesting Officer*  *Acting Director of the United States Patent and Trademark Office*